United States Patent
Kojima

(10) Patent No.: US 10,131,378 B2
(45) Date of Patent: Nov. 20, 2018

(54) ELECTRIC POWER STEERING APPARATUS

(71) Applicant: NSK Ltd., Tokyo (JP)

(72) Inventor: Atsushi Kojima, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/536,420

(22) PCT Filed: Oct. 30, 2015

(86) PCT No.: PCT/JP2015/080659
§ 371 (c)(1),
(2) Date: Jun. 15, 2017

(87) PCT Pub. No.: WO2016/136031
PCT Pub. Date: Sep. 1, 2016

(65) Prior Publication Data
US 2017/0334482 A1 Nov. 23, 2017

(30) Foreign Application Priority Data

Feb. 25, 2015 (JP) ................................. 2015-035274

(51) Int. Cl.
*B62D 6/00* (2006.01)
*B62D 5/04* (2006.01)
*B62D 15/02* (2006.01)

(52) U.S. Cl.
CPC .......... *B62D 6/002* (2013.01); *B62D 5/0463* (2013.01); *B62D 5/0466* (2013.01); *B62D 15/025* (2013.01)

(58) Field of Classification Search
CPC .... B62D 6/002; B62D 5/0463; B62D 5/0466; B62D 15/025
See application file for complete search history.

(56) References Cited

U.S. PATENT DOCUMENTS 6,148,951 A * 11/2000 Nishi et al. .......... B62D 5/0463
701/41
7,849,957 B2 * 12/2010 Hara et al. .......... B62D 5/0484
180/446

(Continued)

FOREIGN PATENT DOCUMENTS

JP 3525541 B2 5/2004
JP 3551147 B2 8/2004

(Continued)

OTHER PUBLICATIONS

International Search Report of PCT/JP2015/080659 dated Dec. 1, 2015.

(Continued)

*Primary Examiner* — Dale W Hilgendorf
(74) *Attorney, Agent, or Firm* — Sughrue Mion, PLLC

(57) ABSTRACT

An electric power steering apparatus which has a steering torque sensor to detect a steering torque, a current command value calculating section to calculate a current command value based on the steering torque, a motor to apply an assist torque, and a motor driving control section to drive and control the motor, comprises: a control function with an input steering angle; and a steering angle estimating/calculating section to calculate a front-wheel estimated steering angle and a rear-wheel estimated steering angle based on a 4 wheel speeds and calculate a 4-wheel estimated steering angle. The 4-wheel estimated steering angle is used for a steering angle control.

14 Claims, 21 Drawing Sheets

(56) References Cited

U.S. PATENT DOCUMENTS

| | | | |
|---|---|---|---|
| 8,594,892 B2* | 11/2013 | Fujimoto et al. .... | B62D 5/0463 701/42 |
| 2008/0078608 A1 | 4/2008 | Hara et al. | |
| 2011/0036660 A1* | 2/2011 | Kojo et al. ............. | B62D 6/002 180/446 |
| 2012/0197493 A1 | 8/2012 | Fujimoto et al. | |

FOREIGN PATENT DOCUMENTS

| | | |
|---|---|---|
| JP | 2007-050769 A | 3/2007 |
| JP | 2008-018911 A | 1/2008 |
| JP | 2009-012656 A | 1/2009 |
| JP | 4671435 B2 | 4/2011 |
| JP | 2012-056402 A | 3/2012 |
| JP | 2013-147174 A | 8/2013 |
| WO | 2011/048702 A1 | 4/2011 |

OTHER PUBLICATIONS

International Preliminary Report on Patentability of PCT/JP2015/080659 dated Jan. 17, 2017.

\* cited by examiner

ELECTRIC POWER STEERING APPARATUS

CROSS REFERENCE TO RELATED APPLICATIONS

This application is a National Stage of International Application No. PCT/JP2015/080659 filed Oct. 30, 2015, claiming priority based on Japanese Patent Application No. 2015-035274 filed Feb. 25, 2015, the contents of all of which are incorporated herein by reference in their entirety.

TECHNICAL FIELD

The present invention relates to an electric power steering apparatus comprising a control function inputting a steering angle, which calculates an estimated steering angle by estimating a steering angle by using 4-wheel speed signals, and judges a probability of the estimated steering angle on the basis of the 4 wheel speeds and corrects the estimated steering angle or the control output using the estimated steering angle thereby to prevent an irregular output of the control using the estimated steering angle.

The present invention further relates to an electric power steering apparatus comprising a steering wheel return control function using a steering angle estimated from a wheel speed.

BACKGROUND ART

An electric power steering apparatus (EPS) for applying a steering auxiliary force (an assist force) to a steering mechanism of a vehicle by using a rotational force of a motor gives a drive force of the motor by a transmission mechanism such as gear or belt via a reduction machine, and gives a steering assist force to the steering shaft or the rack shaft. The conventional electric power steering apparatus performs a feedback control on a motor current in order to accurately a generate torque of the steering assist force. The feedback control is directed for adjusting a motor applied-voltage such that a difference between a current command value and a motor current detection value is small, and the adjustment of the motor applied-voltage is generally made by adjustment of duty of a pulse width modulation (PWM)-control.

A typical configuration of an electric power steering apparatus will be described with reference to FIG. 1, and a column shaft (steering shaft or steering wheel shaft) 2 of a steering wheel (handle) 1 is coupled to steered wheels 8L and 8R via reduction gears 3, universal joints 4a and 4b, a pinion rack mechanism 5, and tie rods 6a and 6b and further via hub units 7a and 7b. Further, the column shaft 2 is inserted with a torsion bar, and a torque sensor 10 for detecting a steering torque Th, and a steering angle sensor 14 for detecting a steering angle θ of the steering wheel 1, and a motor 20 for assisting a steering force of the steering wheel 1 is coupled with the column shaft 2 via the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist (steering assist) command based on the steering torque Th detected by the torque sensor 10 and a vehicle speed Vel detected by a vehicle speed sensor 12, and controls a current to be supplied to the motor 20 by a voltage control value Vref by which the current command value is compensated for. The vehicle speed Vel can be received from a CAN (Controller Area Network) or the like.

As well, the steering angle sensor 14 is not essential, and may not be provided, and a steering angle can be obtained from a rotational sensor such as resolver coupled to the motor 20.

The control unit 30 is connected with a controller area network (CAN) 40 for exchanging various items of information of the vehicle, and can receive the vehicle speed Vel from the CAN 40. Further, the control unit 30 can be connected with a non-CAN 41 for making communication with other than the CAN 40 or exchanging analog/digital signals, radio waves or the like.

The control unit 30 is mainly configured of a CPU (Central Processing Unit) (including MPU (Micro Processor Unit) or MCU (Micro Controller Unit)), and its typical functions performed by a program inside the CPU are as shown in FIG. 2.

The functions and operations of the control unit 30 will be described with reference to FIG. 2, and the steering torque Th detected by the torque sensor 10 and the vehicle speed Vel from the vehicle speed sensor 12 (or the CAN 40) are inputted into a current command value calculating section 31, and the current command value calculating section 31 calculates a current command value Iref1 with a parameter of the vehicle speed Vel by using an assist map. The upper limit of the calculated current command value Iref1 is limited at a current limiting section 33, and a limited current command value Iref2 is inputted into a subtracting section 34. The subtracting section 34 obtains a deviation Iref3 (=Iref2−Im) between the current command value Iref2 and a feed-back motor current Im, and the deviation Iref3 is processed with a PI (Proportional-Integral)-control or the like at a current control section 35. The voltage control value Vref obtained by the current control is inputted into a PWM-control section 36 to calculate duty, and the motor 20 is PWM-driven with the duty via an inverter 37. The motor current Im of the motor 20 is detected by a motor current detector 38, and is fed back to the subtracting section 34.

In comparison with a conventional hydraulic power steering apparatus, the electric power steering apparatus mounts the motor and the gears thereon, and therefore has a problem that it has a large friction and a steering wheel returnability is deteriorated after the turn at an intersection or the like. In order to improve the steering wheel returnability at the intersection, a steering wheel return control has been widely used on the basis of a steering angle by using a steering angle sensor as disclosed in Japanese Patent No. 3551147 (Patent Document 1). That is, FIG. 3 shows a schematic configuration of the apparatus described in Patent Document 1, in which there is provided a steering wheel return control section 32 for calculating a steering wheel return current HR based on the steering angle θ and a steering angle speed ω and the vehicle speed Vel. The calculated steering wheel return current HR is added to the current command value Iref1 at an adding section 32A, and a current command value Iref4 corrected by the steering wheel return current HR is inputted into the current limiting section 33. However, the apparatus disclosed in Patent Document 1 mounts the steering angle sensor thereon, which causes an increase in cost, and thus the steering wheel return control without the need of a steering angle sensor is desired.

In this connection, there has been proposed an electric power steering apparatus for controlling the steering wheel return by using a wheel speed (Japanese Patent No. 3525541 (Patent Document 2)). However, since the electric power steering apparatus described in Patent Document 2 performs the steering wheel return control based on the steering angle estimated from the right and left wheel speed signals, there is a problem that the steering angle is erroneously estimated in case of vehicle slip on a snowy road or the like and the steering wheel rotates in a driver-unintended direction.

Further, there has been known an electric power steering apparatus for, when the steering angle estimated from the right and left rear wheel speed signals and the steering angle sensor value are compared and then a difference therebetween is abnormal relative to its threshold, reducing the control output using the estimated steering angle (preventing an irregular output) (Japanese Patent No. 4671435 (Patent Document 3)). However, the apparatus described in Patent Document 3 needs a steering angle sensor, and has a problem that an increase in cost is caused.

THE LIST OF PRIOR ART DOCUMENTS

Patent Documents

Patent Document 1: Japanese Patent No. 3551147
Patent Document 2: Japanese Patent No. 3525541
Patent Document 3: Japanese Patent No. 4671435

SUMMARY OF INVENTION

Problems to be Solved by the Invention

The present invention has been developed in view of the above-described circumstances, and an object of the present invention is to provide an electric power steering apparatus with a high performance to calculate a front-wheel estimated steering angle based on right and left front wheel speeds, to calculate a rear-wheel estimated steering angle based on right and left rear wheel speeds, to calculate a 4-wheel estimated steering angle by using the front-wheel estimated steering angle and the rear-wheel estimated steering angle, and to correct a probability of the 4-wheel estimated steering angle or correct an output of a control with the 4-wheel estimated steering angle by using the front-wheel estimated steering angle, the rear-wheel estimated steering angle and the 4 wheel speeds, thereby preventing an irregular output without the need of a steering angle sensor.

Means for Solving the Problems

The present invention relates to an electric power steering apparatus which has a steering torque sensor to detect a steering torque inputted into a steering mechanism, a current command value calculating section to calculate a current command value based on at least the steering torque, a motor to apply an assist torque to the steering mechanism, and a motor driving control section to drive and control the motor based on the current command value, the above-described object of the present invention is achieved by that: comprises a control function with an input steering angle; and a steering angle estimating/calculating section to calculate a front-wheel estimated steering angle and a rear-wheel estimated steering angle based on the 4 wheel speeds and calculate a 4-wheel estimated steering angle by using the front-wheel estimated steering angle and the rear-wheel estimated steering angle, wherein the 4-wheel estimated steering angle is used for a steering angle control.

Further, the above-described object of the present invention is more effectively achieved by that: further comprising a correction gain calculating section to calculate a correction gain to correct the 4-wheel estimated steering angle or an output of a control used the 4-wheel estimated steering angle based on the 4 wheel speeds, the front-wheel estimated steering angle and the rear-wheel estimated steering angle; or wherein the correction gain calculating section comprises: a vehicle slip judging section to output a vehicle slip gain based on the front-wheel estimated steering angle and the rear-wheel estimated steering angle, a driving-wheel slip judging section to output a driving-wheel slip gain based on the 4 wheel speeds, and a multiplying section to multiply the vehicle slip gain by the driving-wheel slip gain thereby to output the correction gain; or wherein the vehicle slip judging section determines a gradual-change amount for vehicle slip gain corresponding to an absolute value of a difference between the front-wheel estimated steering angle and the rear-wheel estimated steering angle, and outputs the vehicle slip gain by gradually changing with the gradual-change amount for vehicle slip gain; or wherein the gradual-change amount for vehicle slip gain is changed corresponding to a vehicle speed; or wherein the driving-wheel slip judging section determines a gradual-change amount for driving wheel slip gain corresponding to an absolute value of a difference between a front wheel speed and a rear wheel speed based on the 4 wheel speeds, and outputs the driving-vehicle slip gain by gradually changing with the gradual-change amount for driving-vehicle slip gain; or wherein the steering angle estimating/calculating section comprises a weighting section to change and calculate weights of the front-wheel estimated steering angle and the rear-wheel estimated steering angle corresponding to the vehicle speed, a steering angle speed, or the steering torque; or wherein said weighting section comprises: a sensitive table to output a front-wheel weight X and a rear-wheel weight Y corresponding to the vehicle speed, the steering angle speed, or the steering torque, a first multiplying section to multiply the front-wheel estimated steering angle by the front-wheel weight X, a second multiplying section to multiply the rear-wheel estimated steering angle by the rear-wheel weight Y, and an adding section to add the multiplied results at the first multiplying section and the second multiplying section thereby to output the 4-wheel estimated steering angle.

Furthermore, the present invention relates to an electric power steering apparatus which has a steering torque sensor to detect a steering torque inputted into a steering mechanism, a current command value calculating section to calculate a current command value based on at least the steering torque, a motor to apply an assist torque to the steering mechanism, and a motor driving control section to drive and control the motor based on the current command value, the above-described object of the present invention is achieved by that: comprises: a steering angle estimating/calculating section to calculate a front-wheel estimated steering angle and a rear-wheel estimated steering angle based on the 4 wheel speeds, and calculate a 4-wheel estimated steering angle by using the front-wheel estimated steering angle and the rear-wheel estimated steering angle; a correction gain calculating section to calculate a correction gain to correct an irregular output based on the 4 wheel speeds, the front-wheel estimated steering angle and the rear-wheel estimated steering angle; and a steering wheel return control section to calculate a steering wheel return control value based on the 4 wheel speeds, the correction gain, a vehicle speed and a motor angular speed estimated-value, wherein the current command value is corrected by the steering wheel return control value.

Effects of the Invention

The electric power steering apparatus according to the present invention calculates the front-wheel estimated steering angle based on the right and left front wheel speeds, calculates the rear-wheel estimated steering angle based on the right and left rear wheel speeds, calculates the 4-wheel estimated steering angle by using the front-wheel estimated steering angle and the rear-wheel estimated steering angle, and corrects the probability of the 4-wheel estimated steering angle or corrects the output of the control using the 4-wheel estimated steering angle with the front-wheel estimated steering angle, the rear-wheel estimated steering angle and the 4 wheel speeds.

Thereby, it is possible to provide the electric power steering apparatus with the high reliability capable of preventing the irregular output without the need of the steering angle sensor at a low cost.

MODE FOR CARRYING OUT THE INVENTION

The present invention is directed for calculating a front-wheel estimated steering angle based on right and left front wheel speeds, calculates a rear-wheel estimated steering angle based on the right and left rear wheel speeds, calculates a 4-wheel estimated steering angle by using the front-wheel estimated steering angle and the rear-wheel estimated steering angle, and corrects a probability of the 4-wheel estimated steering angle or corrects an output of a control with the 4-wheel estimated steering angle by using the front-wheel estimated steering angle, the rear-wheel estimated steering angle and the 4 wheel speeds, thereby preventing an irregular output without the need of a steering angle sensor.

Further, the above configuration is applied to the steering wheel return control.

An embodiment of the present invention will be described below in detail with reference to the drawings. The embodiment will be described below assuming that the present invention is applied to the steering wheel return control.

Figure 1:
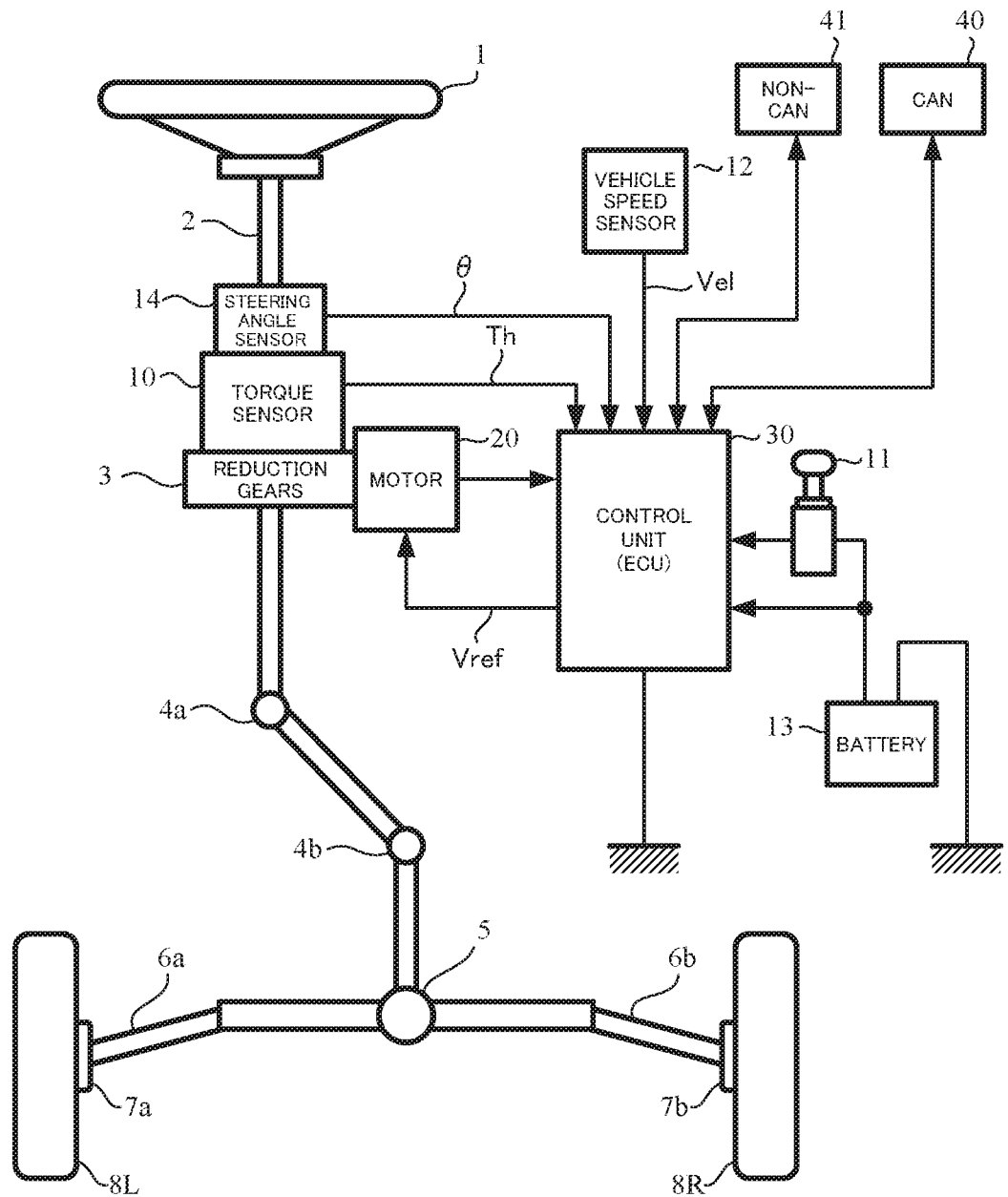
FIG. 1 is a configuration diagram illustrating an outline of an electric power steering apparatus.
Figure 2:
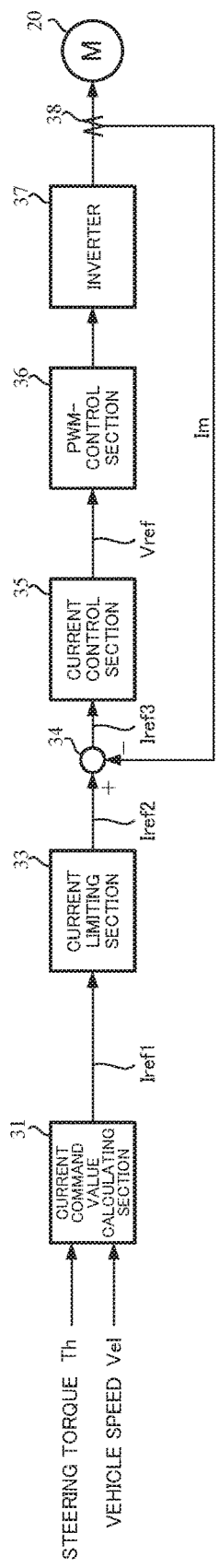
FIG. 2 is a block diagram showing an exemplary configuration of a control system in the electric power steering apparatus.
Figure 3:
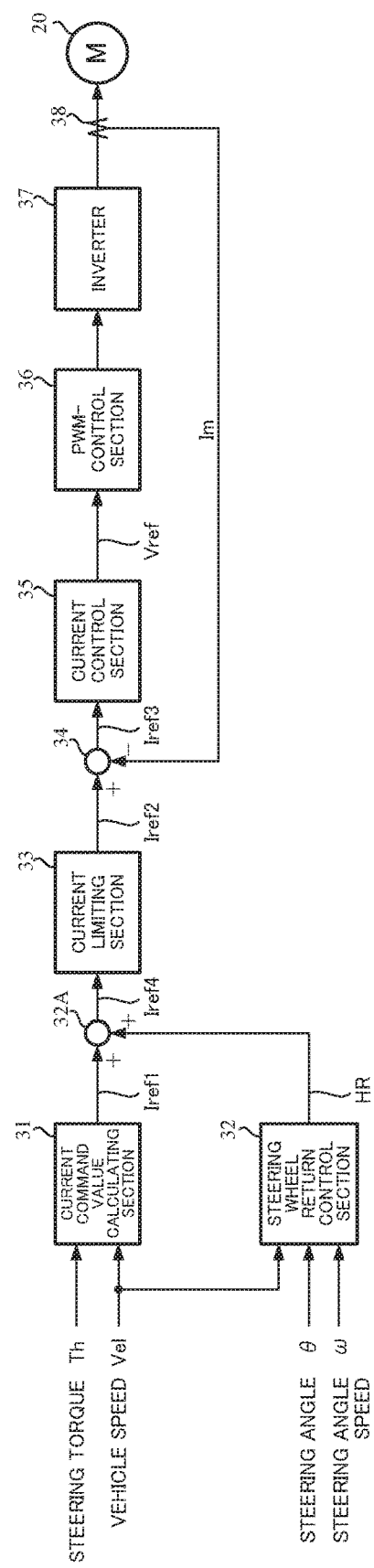
FIG. 3 is a block diagram showing an exemplary configuration of a control system in a conventional electric power steering apparatus with an a steering wheel return control function.
Figure 4:
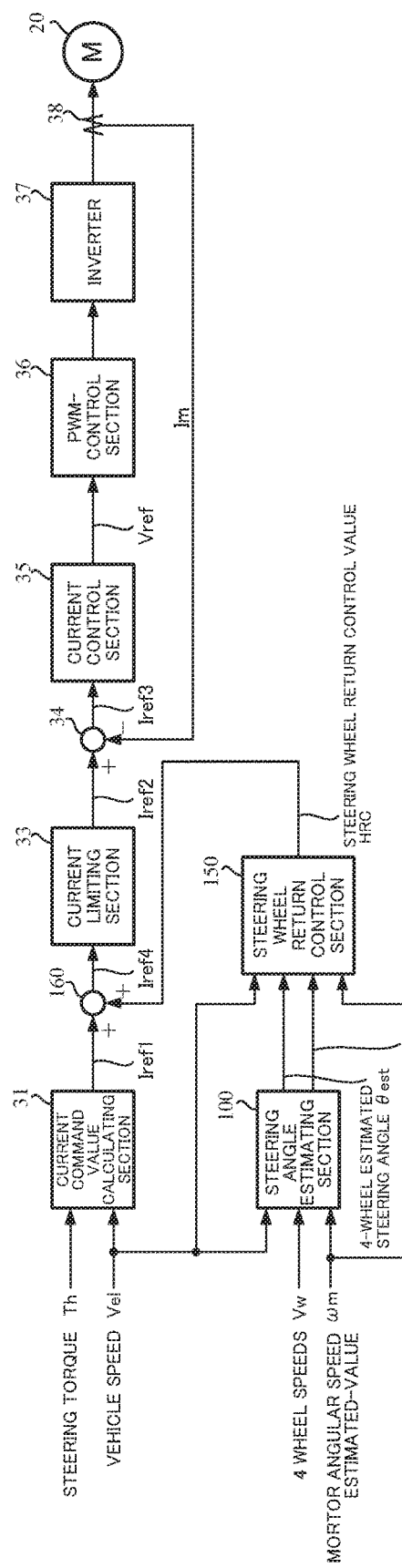
FIG. 4 is a block diagram showing an exemplary configuration of the present invention.

FIG. 4 shows an exemplary configuration of the present invention corresponding to FIG. 3, in which there are newly provided a steering angle estimating section 100 to input the vehicle speed Vel, the 4 wheel speeds (right and left front wheel speeds, right and left rear wheel speeds) Vw and a motor angular speed estimated-value ωm and to calculate a 4-wheel estimated steering angle θest and a correction gain CG; a steering wheel return control section 150 to input the vehicle speed Vel, the motor angular speed estimated-value ωm, the 4-wheel estimated steering angle θest and the correction gain CG and to calculate and output a steering wheel return control value HRC; and an adding section 160 to correct by adding the steering wheel return control value HRC to the current command value Iref1.

Figure 5:
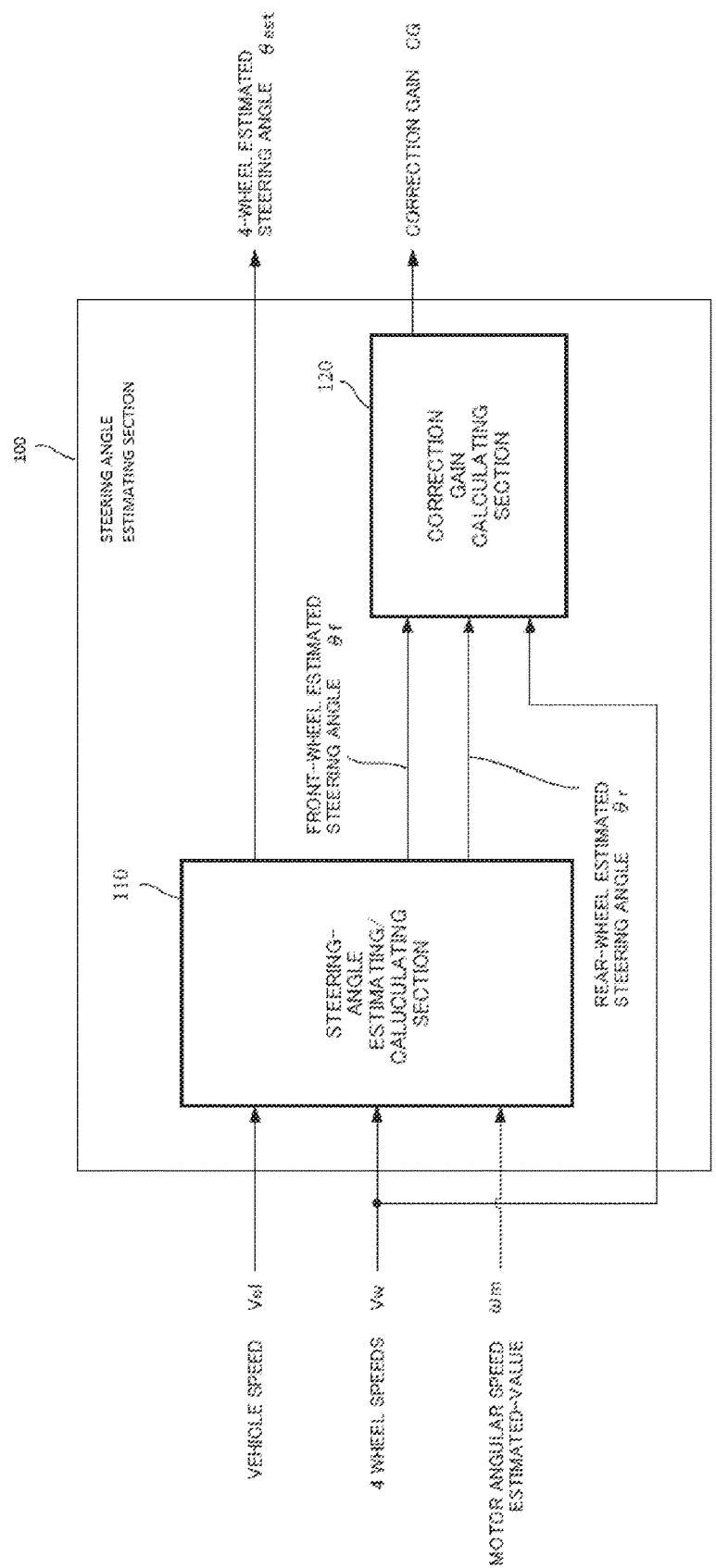
FIG. 5 is a block diagram showing an exemplary configuration of a steering angle estimating section.

As shown in FIG. 5, the steering angle estimating section 100 comprises a steering angle estimating/calculating section 110 to input the vehicle speed Vel, the 4 wheel speeds Vw and the motor angular speed estimated-value ωm and to calculate and then to output the 4-wheel estimated steering angle θest, the front-wheel estimated steering angle θf and the rear-wheel estimated steering angle θr, and a correction gain calculating section 120 to input the 4 wheel speeds Vw, the front-wheel estimated steering angle θf and the rear-wheel estimated steering angle θr and to calculate the correction gain CG.

Figure 6A:
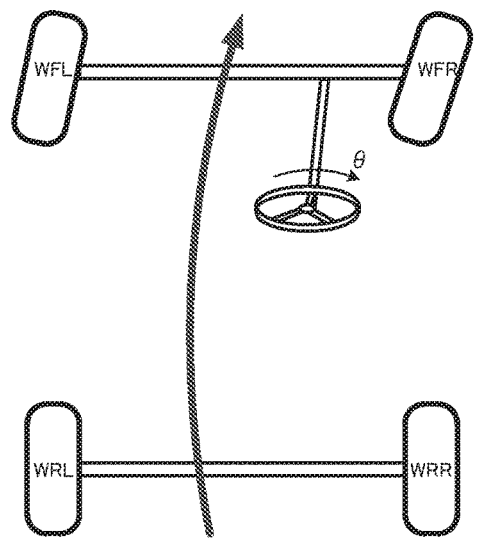
FIGS. 6A to 6C are diagrams for explaining an estimation of a 4-wheel estimated steering angle.
Figure 6B:
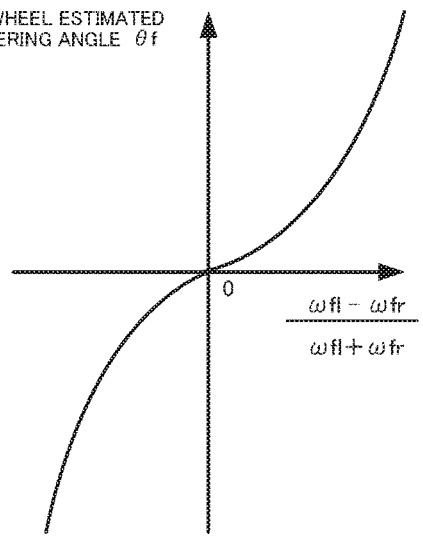
Figure 6C:
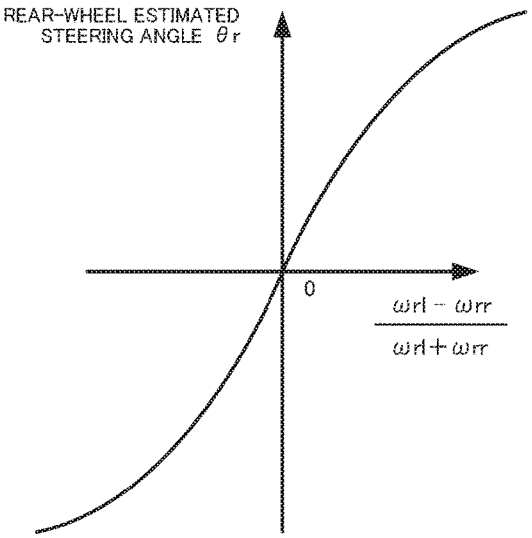

The steering angle estimating/calculating section 110 obtains the front-wheel estimated steering angle θf with a relational equation of the front-wheel speeds and the steering angle θ, and the rear-wheel estimated steering angle θr with a relational equation of the rear-wheel speeds and the steering angle θ as shown in FIGS. 6A, 6B and 6C.

Figure 7:
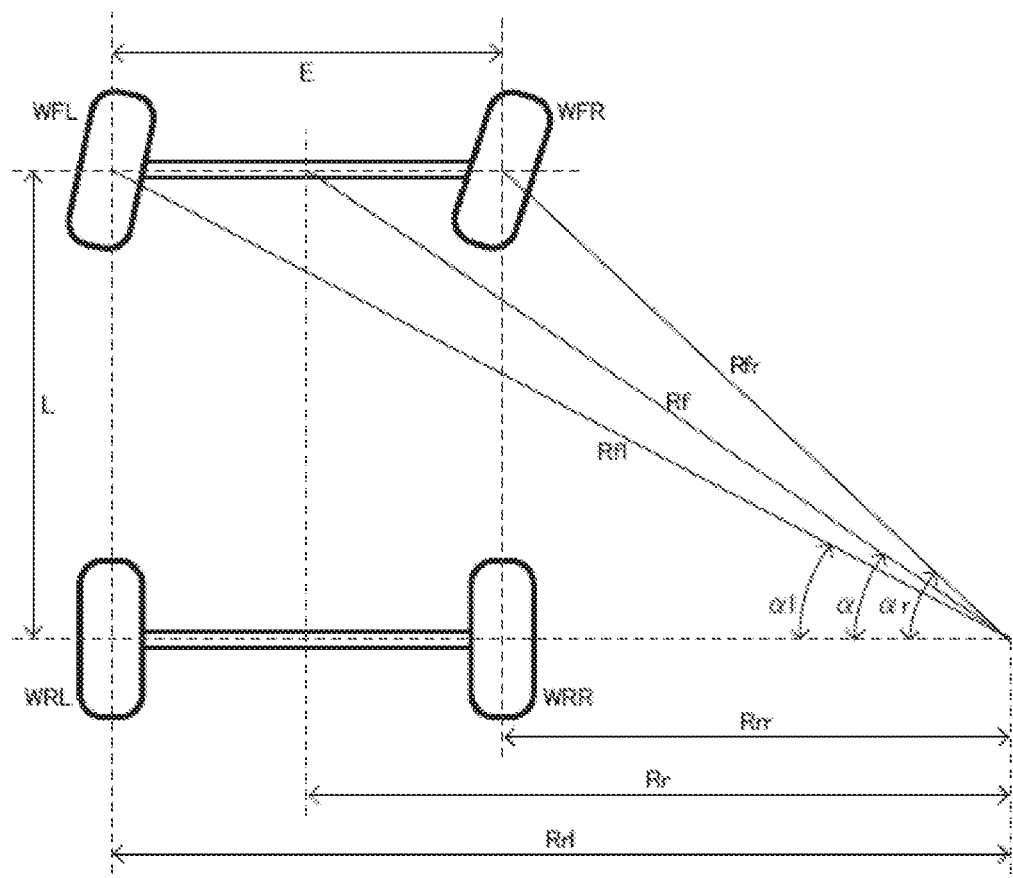
FIG. 7 is a schematic diagram for explaining an estimation of a steering angle.

Although the steering angle estimating/calculating section 110 calculates the front-wheel estimated steering angle θf, the rear-wheel estimated steering angle θr and the estimated 4-wheel steering angle θest based on the 4 wheel speeds Vw, the calculations on the front-wheel estimated steering angle θf and the rear-wheel estimated steering angle θr are performed by using a well-known method disclosed in Japanese Patent No. 4167959, for example. As shown in FIG. 7, the turning radii of the four wheels fl, fr, rl and rr are respectively assumed as Rfl, Rfr, Rrl and Rrr, the angles of the front wheels fl and fr are assumed as αl and αr, the inter-axle distance of the vehicle is assumed as L, and the vehicle width is assumed as E.

Further, the turning radius at the center of the front wheel axle is assumed as Rf and the turning radius at the center of the rear wheel axle is assumed as Rr. Assuming the wheel speeds (wheel angle speeds) of the wheels fl, fr, rl and rr as ωfl for the left front wheel, ωfr for the right front wheel, ωrl for the left rear wheel, and ωrr for the right rear wheel, respectively, the steering angle α at the center of the vehicle body and the respective wheel speeds ωfl, ωfr, ωrl and ωrr have the relationships as in Equations 1 and 2.

$$\alpha_{front} = \frac{1}{2}\arcsin\left\{\frac{4L}{E}\left(\frac{\omega_{fl} - \omega_{fr}}{\omega_{fl} + \omega_{fr}}\right)\right\} \quad \text{[Equation 1]}$$

$$\alpha_{rear} = \arctan\left\{\frac{2L}{E}\left(\frac{\omega_{rl} - \omega_{rr}}{\omega_{rl} + \omega_{rr}}\right)\right\} \quad \text{[Equation 2]}$$

As well, with respect to the 4-wheel estimated steering angle θest, it is possible to increase a robust property against erroneous estimation due to a wheel speed disturbance by using a mean value of the front-wheel estimated steering angle θf and the rear-wheel estimated steering angle θr as in Equation 3 described below.

$$\theta est=(\theta f+\theta r)/2 \quad \text{[Equation 3]}$$

Alternatively, in addition to the mean value, the 4-wheel estimated steering angle θest can change a front-wheel weight X of the front-wheel estimated steering angle θf and a rear-wheel weight Y of the rear-wheel estimated steering angle θr corresponding to the vehicle speed Vel, and can calculate a mean value of the weighted front-wheel estimated steering angle θf and rear-wheel estimated steering angle θr. The equation in this case is Equation 4 described below.

$$\theta est=(\theta f\times X+\theta r\times Y)$$

$$X+Y=1.0 \quad \text{[Equation 4]}$$

Figure 8:
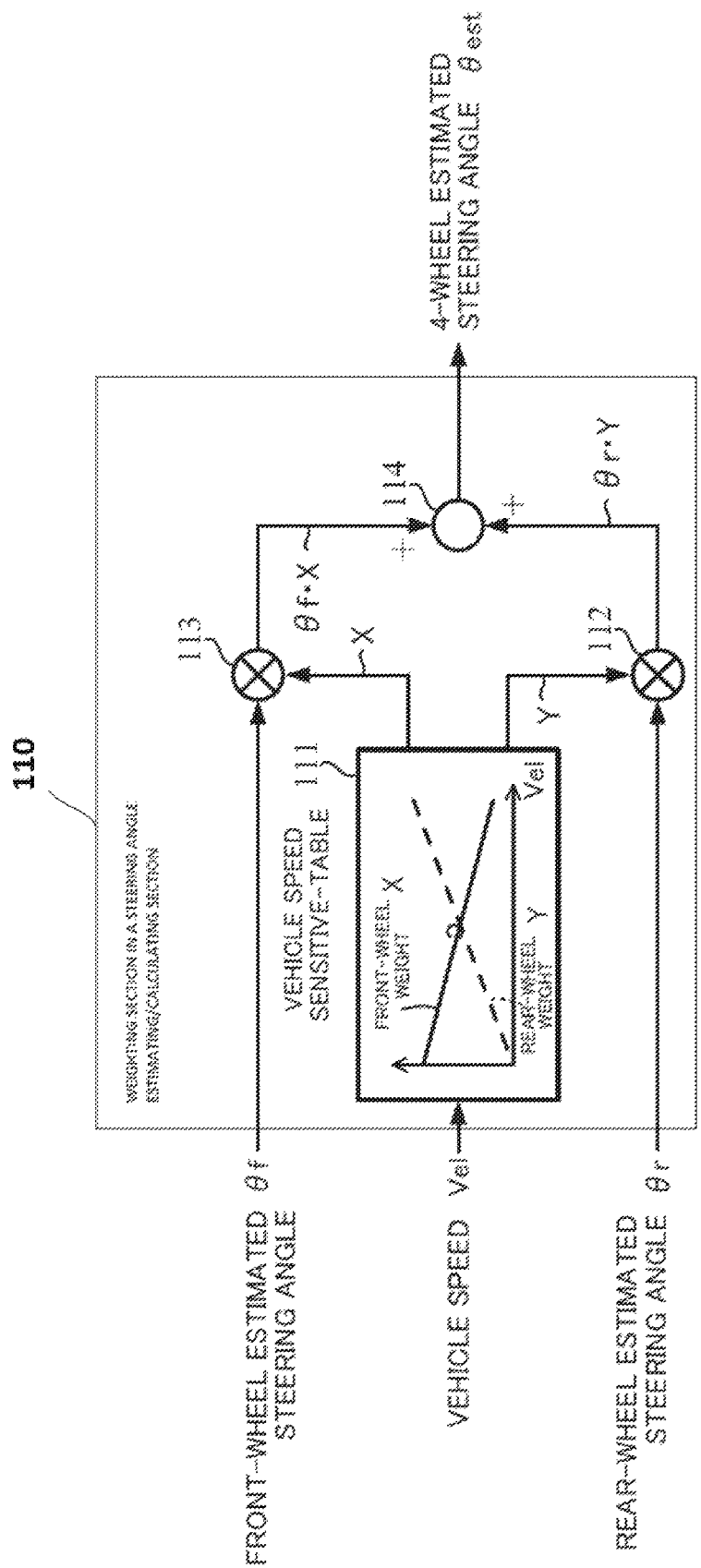
FIG. 8 is a block diagram showing an exemplary configuration of a weighting section in a steering angle estimating/calculating section.

A configuration of a weighting section in the steering angle estimating/calculating section 110 is shown in FIG. 8, for example, when the front-wheel weight X of the front-wheel estimated steering angle θf and the rear-wheel weight Y of the rear-wheel estimated steering angle θr are changed depending on the vehicle speed Vel, respectively. That is, the front-wheel weight X of the front-wheel estimated steering angle and the rear-wheel weight Y of the rear-wheel estimated steering angle are outputted from a vehicle speed-sensitive table 111 in sensitive to the vehicle speed Vel with a relationship of "X+Y=1.0." The rear-wheel weight Y of the rear-wheel estimated steering angle is multiplied by the rear-wheel estimated steering angle θr at a multiplying section 112, and the front-wheel weight X of the front-wheel estimated steering angle is multiplied by the front-wheel estimated steering angle θf at a multiplying section 113. The multiplied results at the multiplying sections 112 and 113 are added at an adding section 114, and the added value is outputted as the 4-wheel estimated steering angle θest.

The vehicle speed-sensitive table 111 sets "X=0.8" and "Y=0.2" at a low vehicle speed, for example. However, since the front wheels are in the half-slip state during turning at a high vehicle speed and the estimation accuracy is reduced, the vehicle speed-sensitive table 111 increases the rear-wheel weight Y of the rear-wheel estimated steering angle θr to be "X=0.2" and "Y=0.8", for example.

As well, although the front-wheel weight X and the rear-wheel weight Y linearly change in FIG. 8, they may nonlinearly change. Further, although the front-wheel weight X and the rear-wheel weight Y are changing corresponding to the vehicle speed in FIG. 8, they may be changed corresponding to the steering angle speed or the steering torque.

Figure 9:
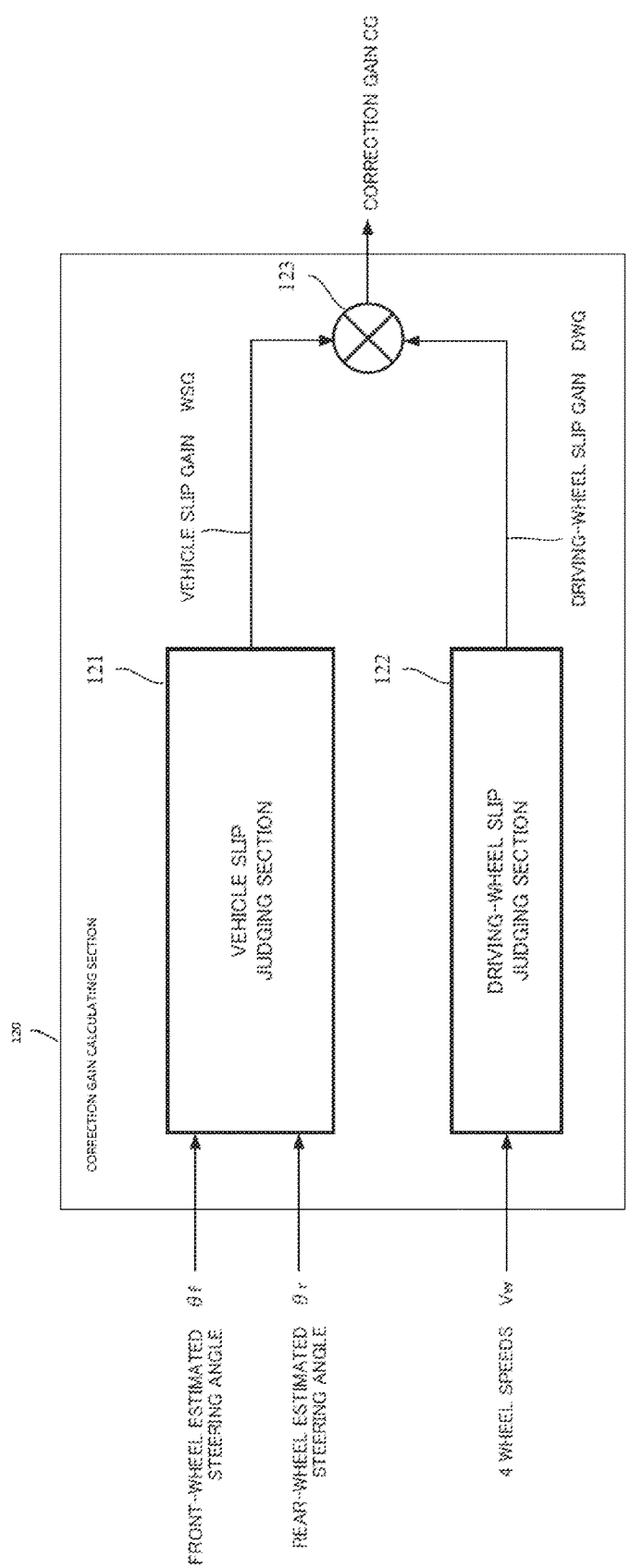
FIG. 9 is a block diagram showing an exemplary configuration of a correction gain calculating section.

The correction gain calculating section 120 judges a vehicle slip and a driving-wheel slip by using the front-wheel estimated steering angle θf, the rear-wheel estimated steering angle θr and the 4 wheel speeds Vw, and calculates the correction gain CG in order to correct a probability of the 4-wheel estimated steering angle θest. As shown in FIG. 9, the correction gain calculating section comprises a vehicle slip judging section 121 and a driving-wheel slip judging section 122, a vehicle slip gain WSG and a driving-wheel slip gain DWG, which are respectively calculated therefrom, are multiplied at a multiplying section 123 and the multiplied result is outputted as the correction gain CG.

Figure 10B:
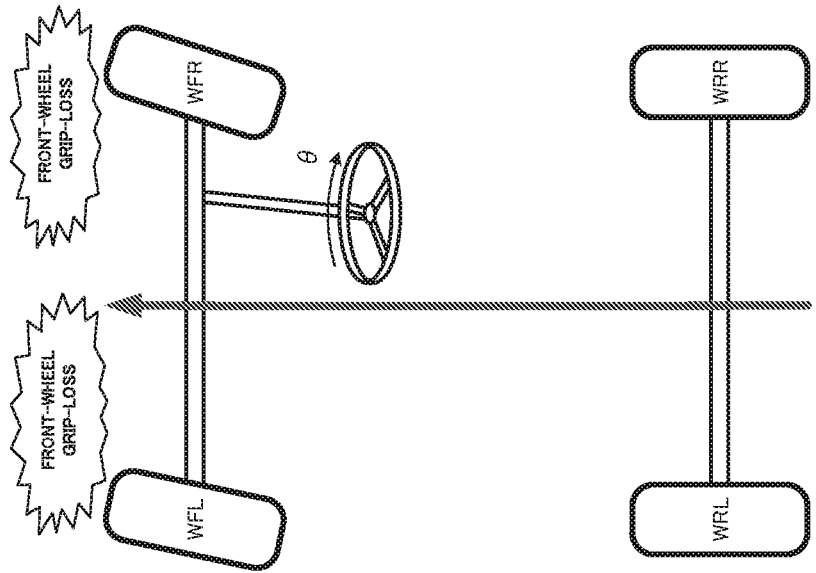
FIGS. 10A and 10B are schematic diagrams for explaining operations of a vehicle slip judging section.
Figure 10A:
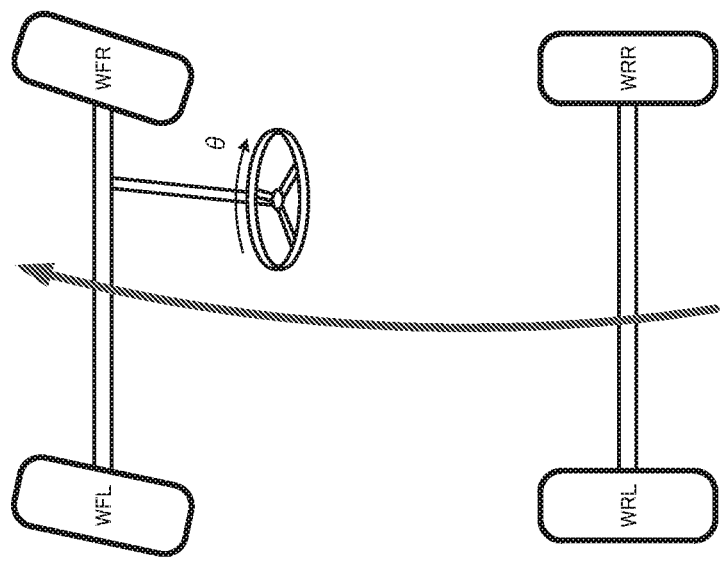
Figure 11:
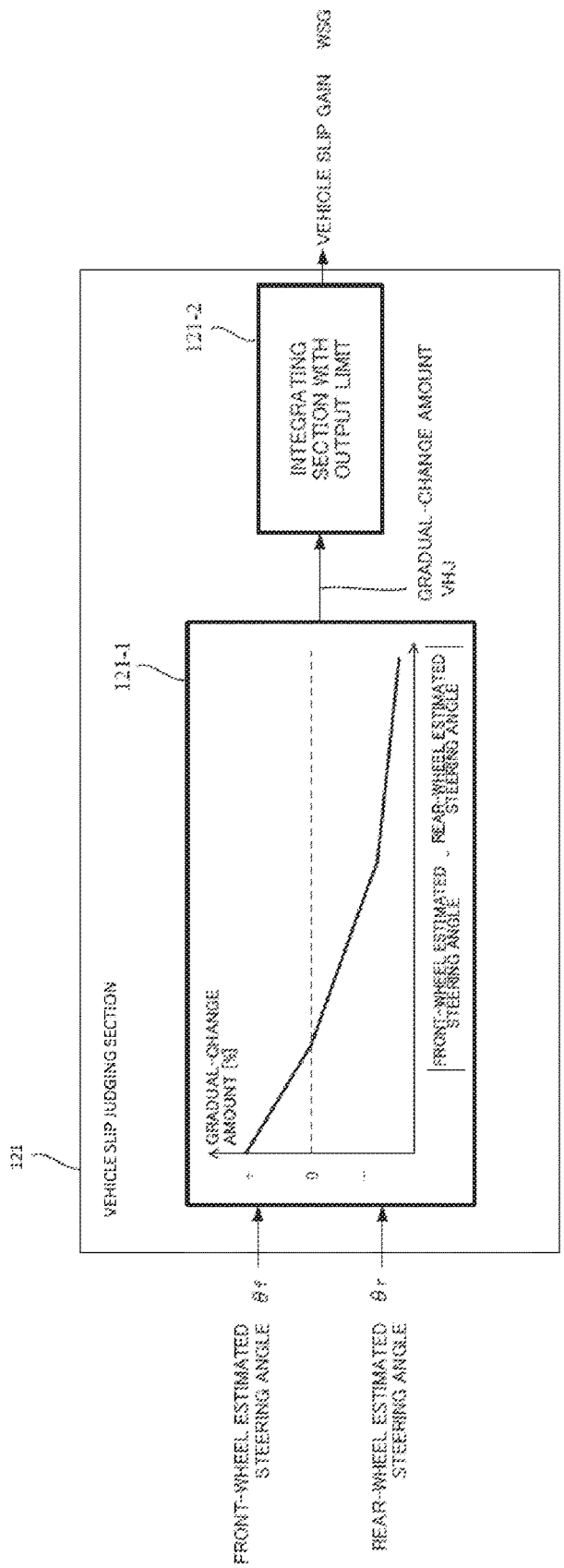
FIG. 11 is a block diagram showing an exemplary configuration of the vehicle slip judging section.

The vehicle slip judging section 121 judges the vehicle slip by using a property that "the front-wheel estimated steering angle θf≈the rear-wheel estimated steering angle θr" is established during a grip running situation as shown in FIG. 10A and the wheel of any of the four wheels slips as shown in FIG. 10B while the vehicle is in the slip state and a difference is caused to be "the front-wheel estimated steering angle θf≠the rear-wheel estimated steering angle θr". Further, as shown in FIG. 11, the vehicle slip judging section 121 calculates a gradual-change amount VHJ for vehicle slip gain at a gradual-change amount calculating section 121-1 corresponding to the absolute value of a difference between the front-wheel estimated steering angle f and the rear-wheel estimated steering angle θr, and increases or decreases the vehicle slip gain WSG due to the gradual-change amount VHJ for vehicle slip gain via an integrating section 121-2 with output limit. When the difference between the front-wheel estimated steering angle f and the rear-wheel estimated steering angle θr is large, the vehicle slip gain WSG is suddenly decreased, and when the difference between the front wheel estimated steering angle f and the rear wheel estimated steering angle θr is small, the vehicle slip gain WSG is gradually increased.

The calculation of the vehicle slip gain WSG is specifically performed so that when the vehicle slips on a snowy curve (when the difference between the front-wheel estimated steering angle f and the rear-wheel estimated steering angle θr is large), the vehicle slip gain WSG is suddenly decreased, and when the vehicle is in the grip state (when the difference between the front-wheel estimated steering angle f and the rear-wheel estimated steering angle θr is small) being a straight running situation, the vehicle slip gain WSG is gradually increased.

Figure 12:
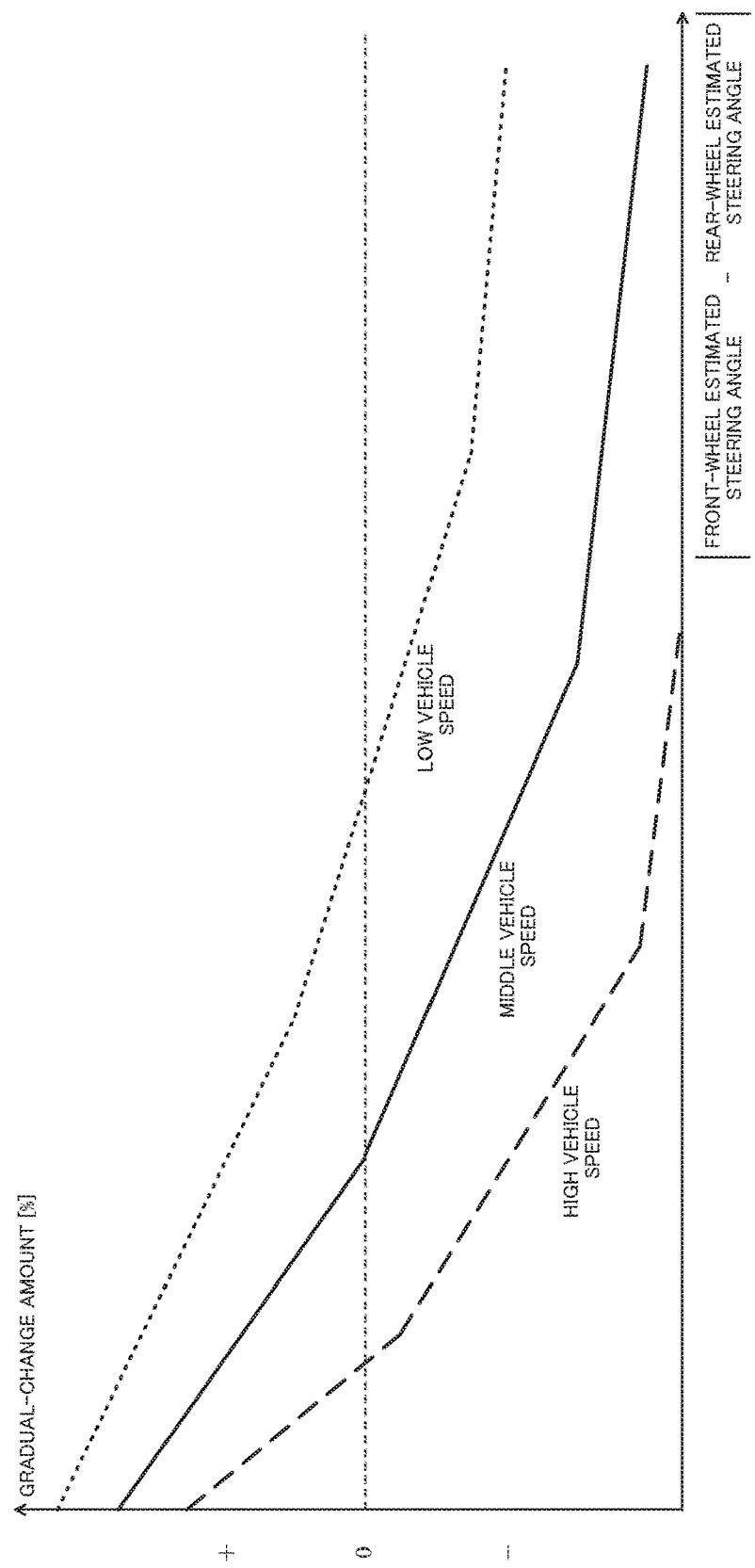
FIG. 12 is a characteristic diagram showing exemplary operations of the vehicle slip judging.

The gradual-change amount for vehicle slip gain is changed corresponding to the vehicle speed as shown in FIG. 12. Since the slip does not easily occur at a low vehicle speed, a threshold to be compared with |"the front-wheel estimated steering angle θf"–"the rear-wheel estimated steering angle θr"| is increased, and since the slip easily occurs at a high vehicle speed, the threshold to be compared with |"the front-wheel estimated steering angle θf"–"the rear-wheel estimated steering angle θr"| is decreased. The setting is changed depending on the control function using the 4-wheel estimated steering angle. The threshold to be compared with |"the front-wheel estimated steering angle θf"–"the rear-wheel estimated steering angle θr"| can be increased at the high vehicle speed.

Figure 13B:
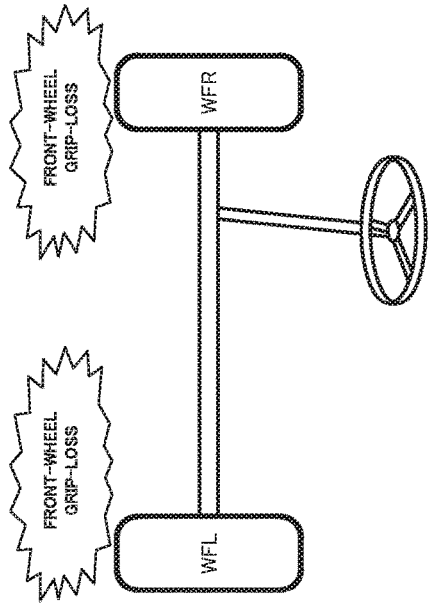
FIGS. 13A and 13B are schematic diagrams for explaining an operation of a driving-wheel slip judging section.
Figure 13B:
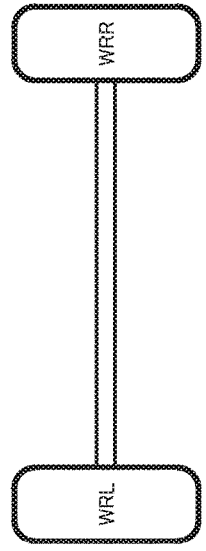
Figure 13A:
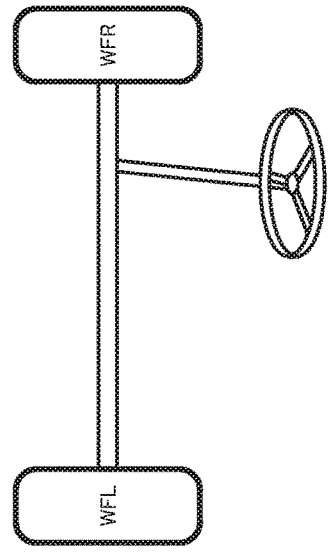
Figure 13A:
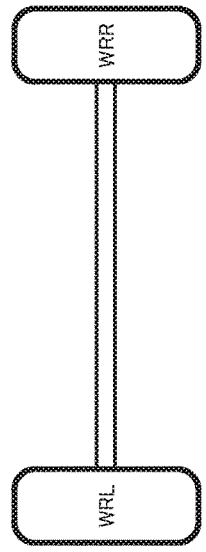

On the other hand, the driving-wheel slip judging section 122 judges the driving wheel slip by using a property that during a driving-wheel grip running situation, "the front wheel speed Wf≈the rear wheel speed Wr" is established as shown in FIG. 13A, and when the driving wheel is in the slip state, the driving wheel of the front wheels or the rear wheels slips as shown in FIG. 13B and the difference of "the front wheel speed Wf≠the rear wheel speed Wr" is caused. The front wheel speed Wf and the rear wheel speed Wr can be obtained in Equations 5 and 6, respectively based on the relationships between the right and left front wheel speeds WFR and WFL and between the right and left rear wheel speeds WRR and WRL.

$$Wf=(WFL+WFR)/2 \qquad \text{[Equation 5]}$$

$$Wr=(WRL+WRR)/2 \qquad \text{[Equation 6]}$$

Figure 14:
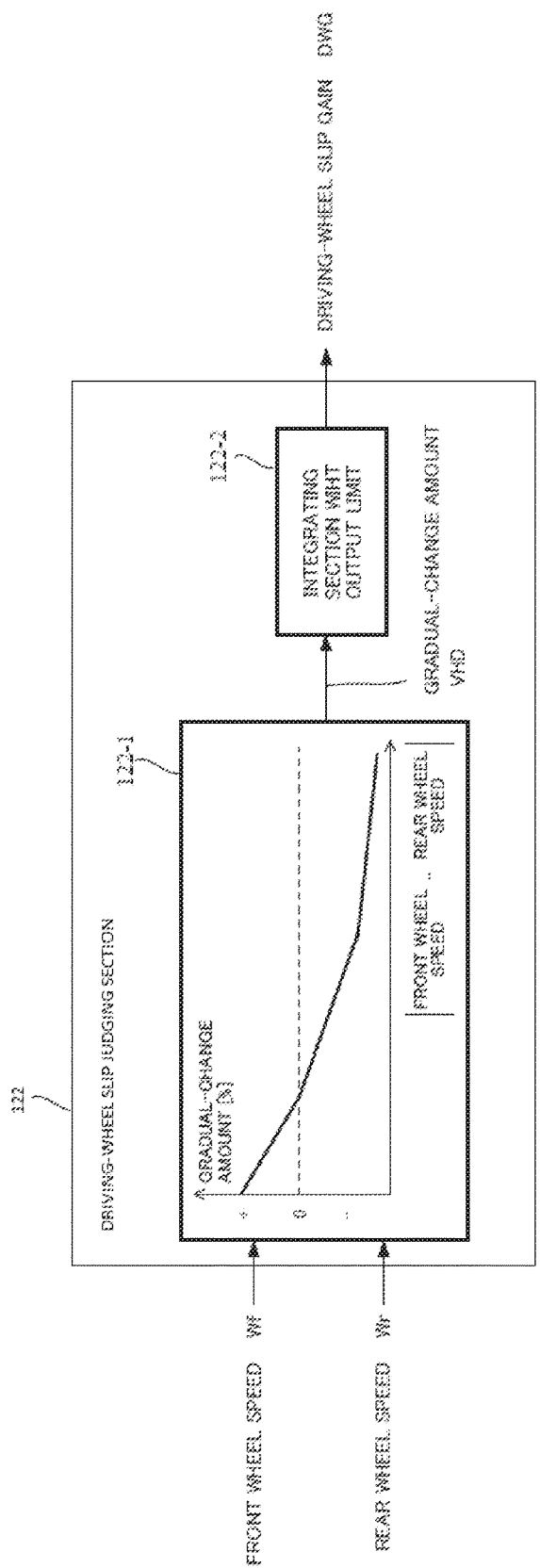
FIG. 14 is a block diagram showing an exemplary configuration of the driving-wheel slip judging section.

Further, as shown in FIG. 14, the driving-wheel slip judging section 122 calculates the gradual-change amount VHD for driving wheel slip gain at the a gradual-change amount calculating section 122-1 corresponding to the difference between the front wheel speed Wf and the rear wheel speed Wr, and increases or decreases the driving-wheel slip gain DWG due to the gradual-change amount VHD for driving-wheel slip gain via the integrating section 122-2 with output limit. When the difference between the front wheel speed Wf and the rear wheel speed Wr is large, the driving-wheel slip gain DWG is suddenly decreased, and when the difference between the front wheel speed Wf and the rear wheel speed Wr is small, the driving-wheel slip gain DWG is gradually increased.

The driving-wheel slip gain DWG is calculated such that when the vehicle suddenly starts on a snowy road (when the difference between the front wheel speed Wf and the rear wheel speed Wr is large), the driving-wheel slip gain DWG is rapidly decreased, and in the grip state (when the difference between the front wheel speed Wf and the rear wheel speed Wr is small), the driving-wheel slip gain DWG is gradually increased.

Both the vehicle slip gain WSG and the driving-wheel slip gain DWG are set to be tunable constants, and thus an abrupt change to a gentle change of each gain can be adjusted, and a responsiveness can be adjusted when the 4-wheel estimated steering angle θest and the control output using the 4-wheel estimated steering angle θest are corrected.

The steering wheel return control section 150 calculates the steering wheel return control value HRC based on the 4-wheel estimated steering angle θest and the correction gain CG, and limits the steering wheel return control value HRC during the vehicle slip situation and the driving-wheel slip situation. The steering wheel return control value HRC is calculated based on the 4-wheel estimated steering angle θest, and thus the unintentional steering wheel return control value HRC is irregularly outputted due to the erroneously-estimated 4-wheel steering angle θest during vehicle slip or driving wheel slip. However, the correction gain CG is decreased during the vehicle slip situation or the driving-wheel slip situation, thereby limiting the irregular output.

Figure 15:
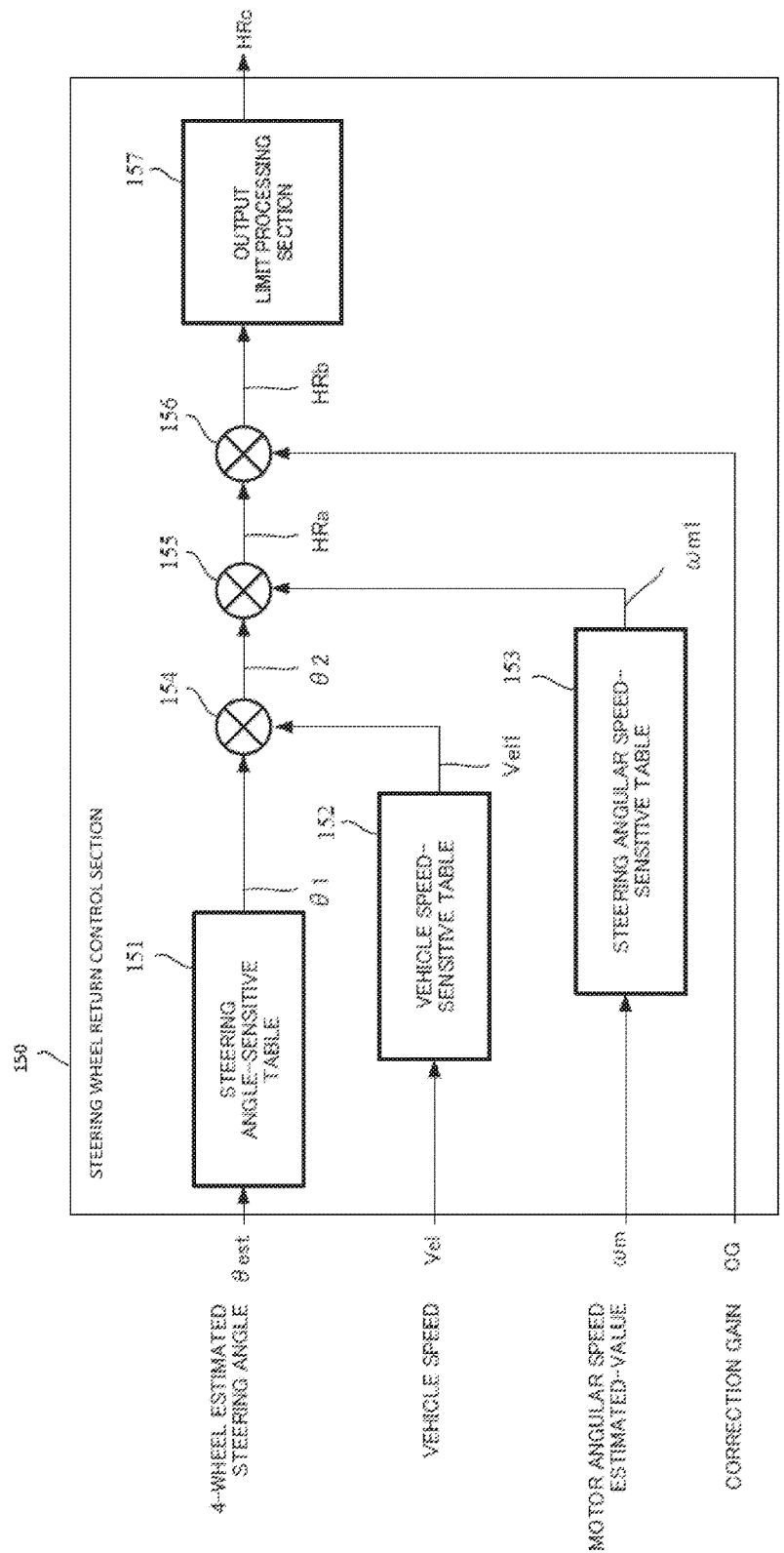
FIG. 15 is a block diagram showing an exemplary configuration of a steering wheel return control section.
Figure 16:
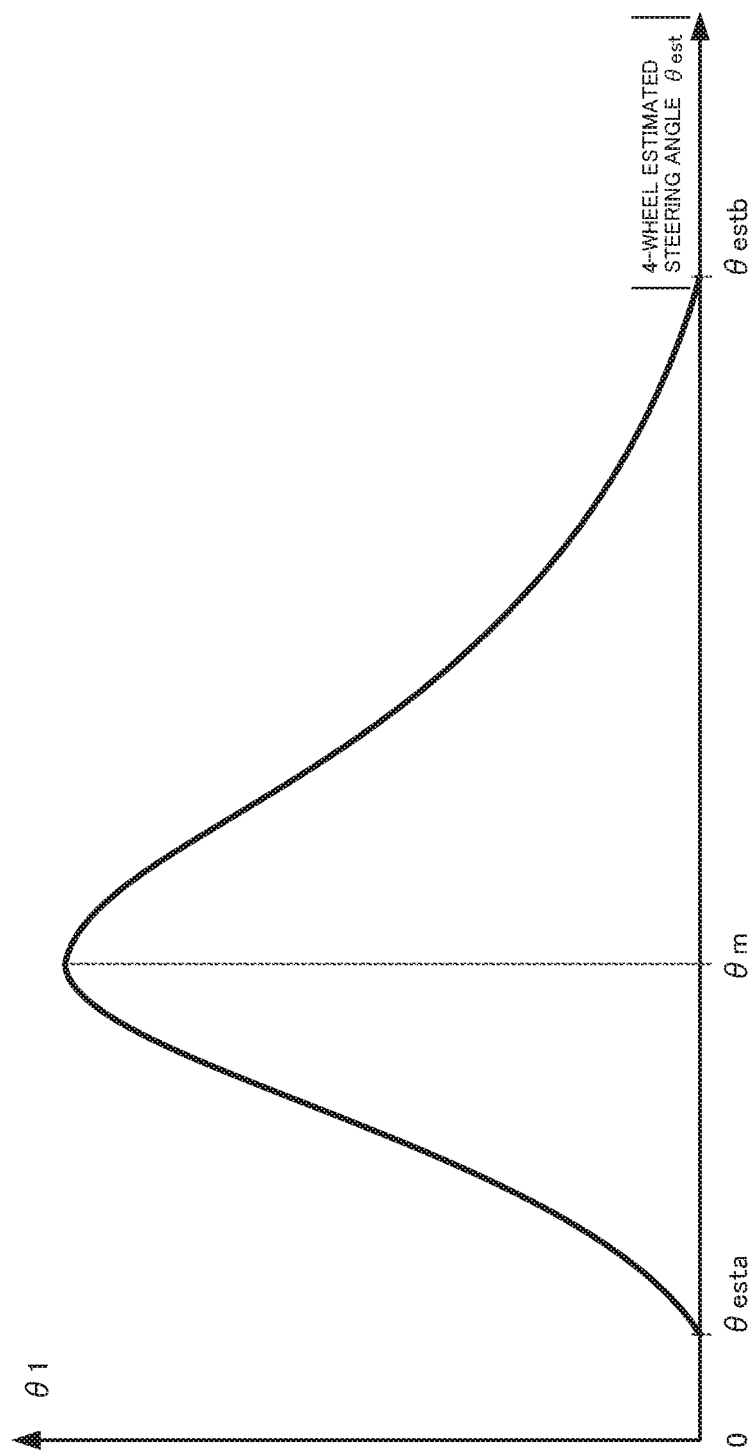
FIG. 16 is a characteristic diagram showing an example of steering angle-sensitive table.

FIG. 15 shows an exemplary configuration of the steering wheel return control section 150, in which the 4-wheel estimated steering angle θest is inputted into a steering angle-sensitive table 151 having the property indicated in FIG. 16, and a steering angle θ1 outputted from the steering angle-sensitive table 151 is inputted into a multiplying section 154. The property of the steering angle-sensitive table 151 shown in FIG. 16 is such that θ1 gradually increases from a 4-wheel estimated steering angle θesta relative to the absolute value of the 4-wheel estimated steering angle θest, reaches a peak at a 4-wheel estimated steering angle Gm, then gradually decreases, and reaches "0" after a 4-wheel estimated steering angle θestb. Further, the vehicle speed Vel is inputted into a vehicle speed-sensitive table 152 having the property indicated in FIG. 17, an output yell of the vehicle speed-sensitive table 152 is inputted into the multiplying section 154, the motor angular speed estimated-value ωm is inputted into a steering angle speed-sensitive table 153 having the property indicated in FIG. 18, and an output ωm1 of the steering angle speed-sensitive table 153 is inputted into a multiplying section 155.

Figure 17:
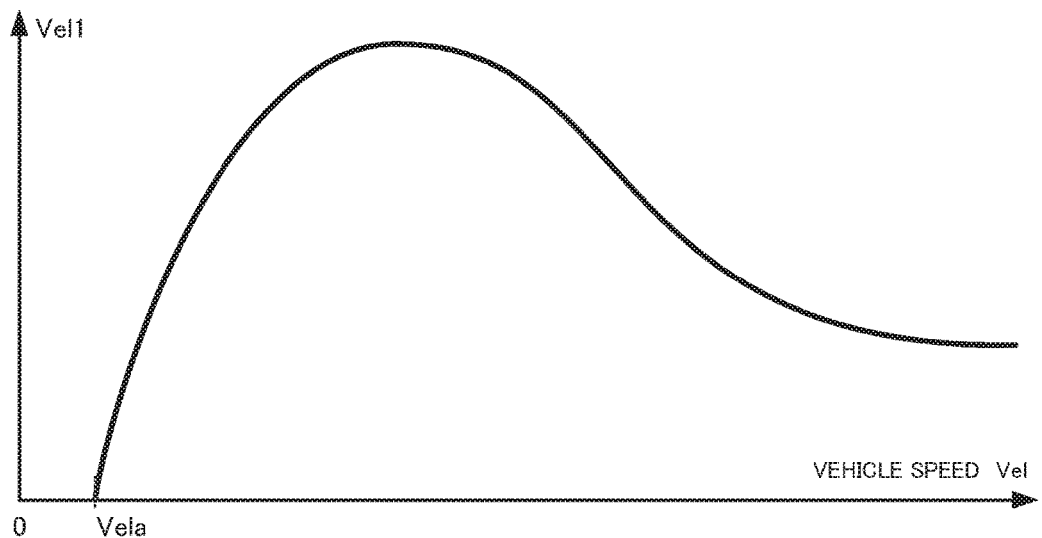
FIG. 17 is a characteristic diagram showing an example of a vehicle speed-sensitive table.
Figure 18:
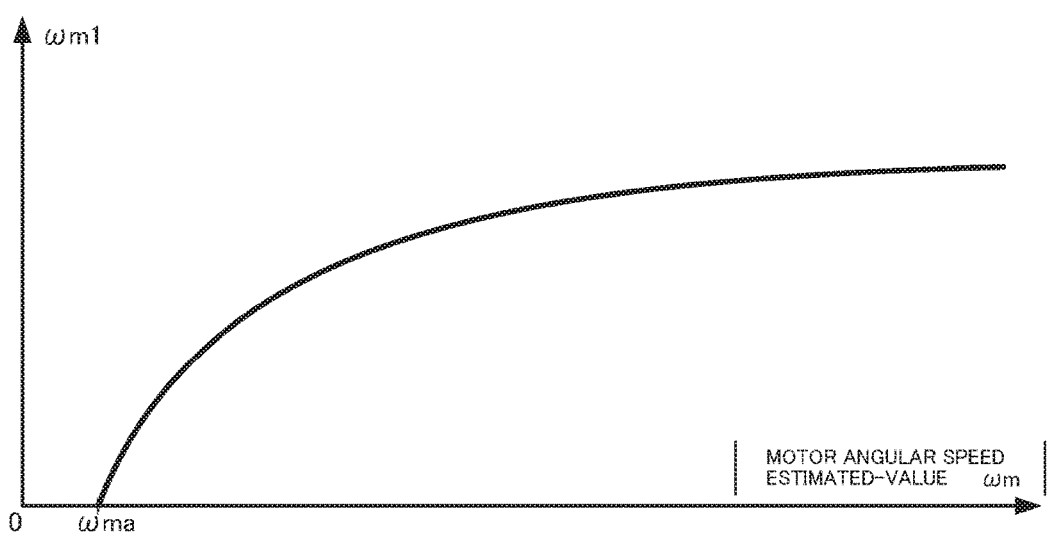
FIG. 18 is a characteristic diagram showing an example of a steering angle speed-sensitive table.

The vehicle speed-sensitive table 152 has a property that Vel1 suddenly and nonlinearly increases from a low vehicle speed Vela and gradually decreases after a predetermined peak as shown in FIG. 17. Further, the steering angle velocity-sensitive table 153 has a property that ωm1 gradually and nonlinearly increases from a motor angular speed estimated-value ωma relative to the absolute value of the motor angular speed estimated-value ωm as shown in FIG. 18.

The outputs θ1 and Vel1 are multiplied at the multiplying section 154, the multiplied result θ2 is inputted into the multiplying section 155 and is multiplied by the output ωm1 at the multiplying section 155, and a basic control value HRa being the multiplied result is inputted into a multiplying section 156 to be multiplied by the correction gain CG. A basic control value HRb obtained at the multiplying section 156 is inputted into an output limit processing section 157 for limiting maximum value output, and the output-limited steering wheel return control value HRC is outputted.

Figure 19:
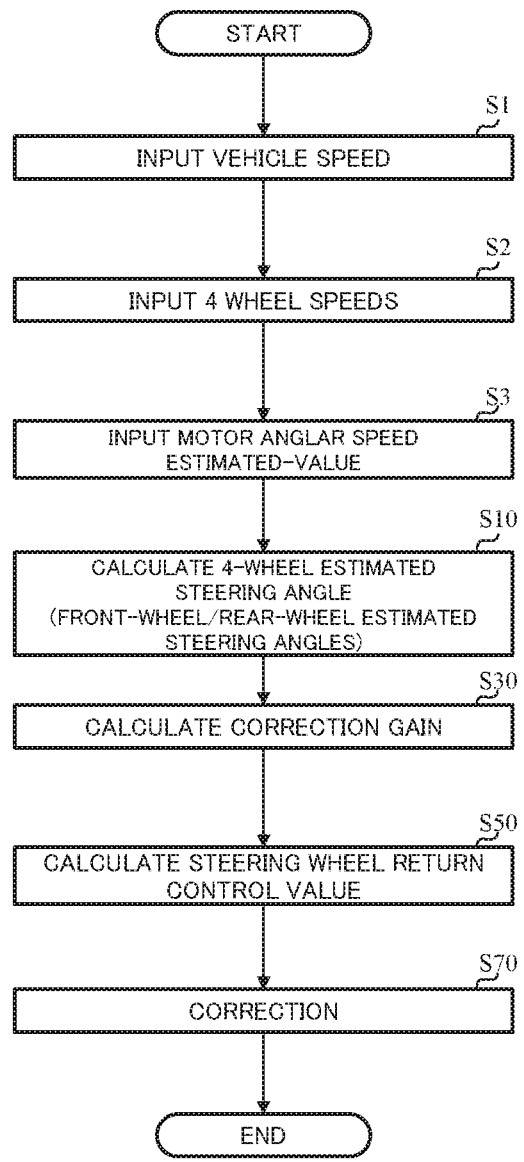
FIG. 19 is a flowchart showing exemplary operations of the present invention.

The entire exemplary operations in the configuration will be first described with reference to the flowchart of FIG. 19 and the exemplary configuration of FIG. 4.

The vehicle speed Vel is inputted into the steering angle estimating section 100 (Step S1), the 4 wheel speeds Vw is inputted therein (Step S2), and the motor angular speed estimated-value ωm is inputted therein (Step S3). An order of the inputs may be changed as needed. The steering angle estimating section 100 calculates the front-wheel estimated steering angle θf and the rear-wheel estimated steering angle θr based on the inputted the vehicle speed Vel, the 4 wheel speeds Vw and the motor angular speed estimated-value ωm, and calculates and outputs the 4-wheel estimated steering angle θest (Step S10). The steering angle estimating section 100 further calculates and outputs the correction gain CG (Step S30). The 4-wheel estimated steering angle θest and the correction gain CG are inputted into the steering wheel return control section 150, and the steering wheel return control section 150 calculates the steering wheel return control value based on the 4-wheel estimated steering angle θest (Step S50), and corrects the steering wheel return control value due to the correction gain CG (Step S70). The steering wheel return control value HRC is added to the current command value Iref1 at an adding section 160.

Figure 20:
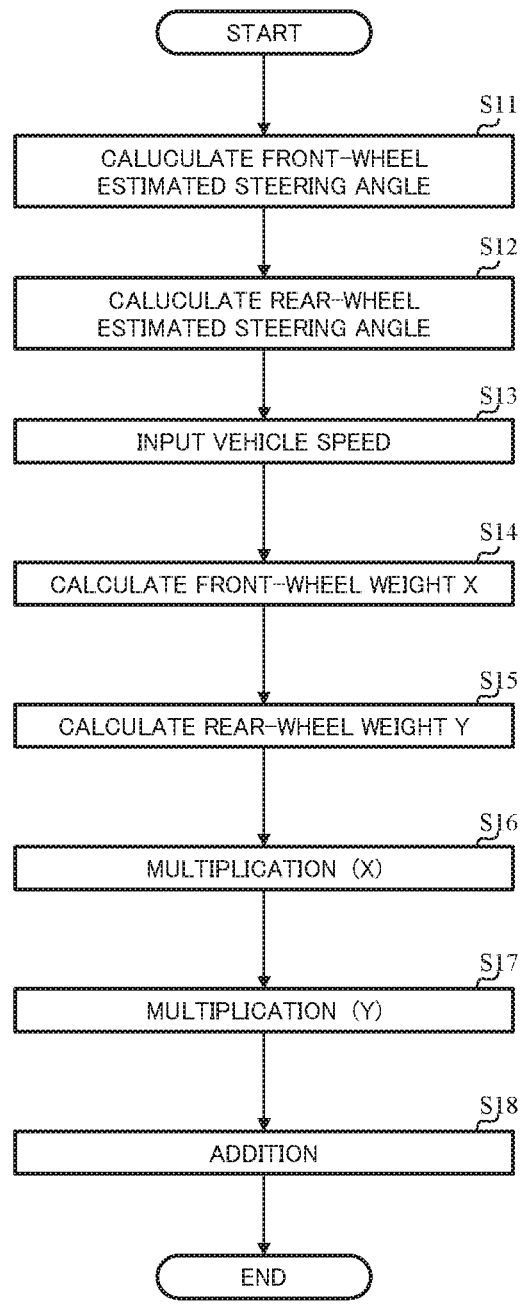
FIG. 20 is a flowchart showing exemplary operations of the steering angle estimating/calculating section.

Next, the exemplary operations of the weighting section for weighting the front-wheel weight X and the rear-wheel weight Y on the estimated front and rear wheel steering angles θf and θr, respectively at the steering angle estimating/calculating section 110 will be described below with reference to the flowchart of FIG. 20 and the exemplary configuration of FIG. 8.

The front-wheel estimated steering angle θf is first calculated at the steering angle estimating/calculating section 110 (Step S11), and then the rear-wheel estimated steering angle θr is calculated therein (Step S12). The order may be reverse. The vehicle speed Vel is inputted into the vehicle speed-sensitive table 111 in the weighting section (Step S13), and the vehicle speed-sensitive table 111 calculates the front-wheel weight X corresponding to the vehicle speed Vel (Step S14), and calculates the rear-wheel weight Y (Step S15). The front-wheel weight X is inputted into the multiplying section 113 and multiplied by the front-wheel estimated steering angle θf (Step S16), and the multiplied result θf·X is added at the adding section 114. Further, the rear-wheel weight Y is inputted into the multiplying section 112 and multiplied by the rear-wheel estimated steering angle θr (Step S17), and the multiplied result θr·Y is added at the adding section 114. The multiplied results θf·X and θr·Y are added at the adding section 114, and the 4-wheel estimated steering angle θest as the added result is outputted (Step S18).

The calculation order of the front-wheel weight X and the rear-wheel weight Y and the multiplication order at the multiplying sections 112 and 113 can be changed as needed.

Figure 21:
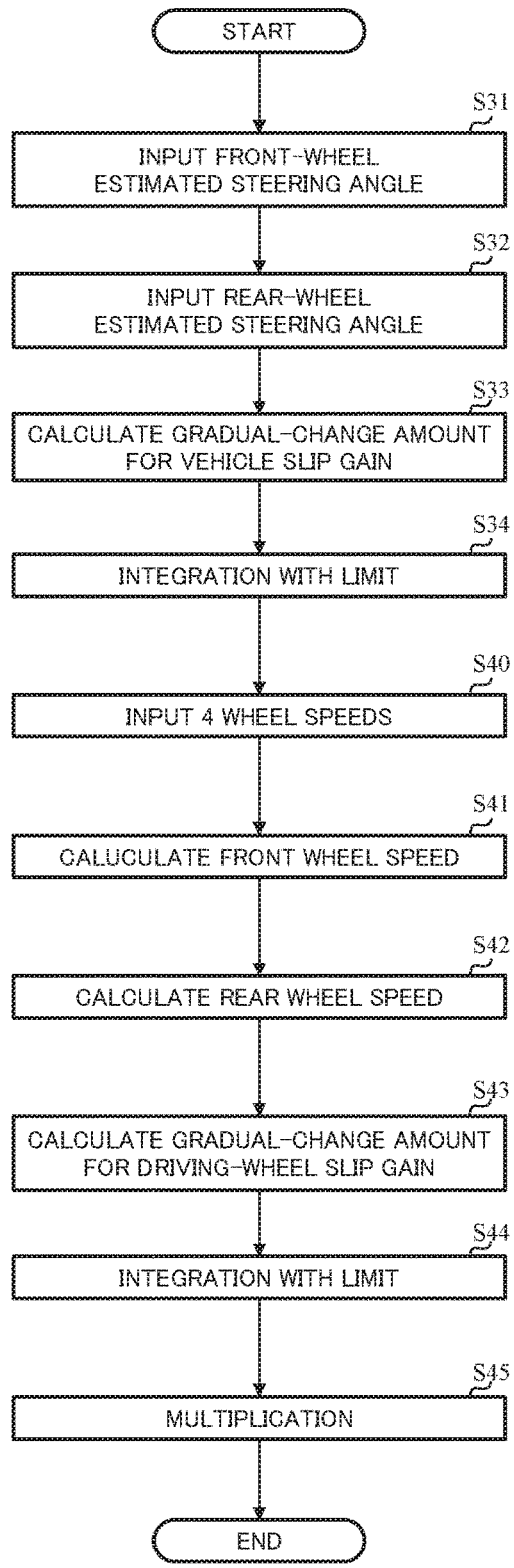
FIG. 21 is a flowchart showing exemplary operations of the correction gain calculating section.

The exemplary operations of the correction gain calculating section 110 will be described below with reference to the flowchart of FIG. 21 and the exemplary configurations of FIG. 9, FIG. 11 and FIG. 14.

The front-wheel estimated steering angle θf is inputted into the vehicle slip judging section 121 in the correction gain calculating section 120 (Step S31), and the rear-wheel estimated steering angle θr is inputted therein (Step S32). The vehicle slip judging section 121 calculates the gradual-change amount VHJ for vehicle slip gain corresponding to the absolute value of the difference between the front-wheel estimated steering angle θf and the rear-wheel estimated steering angle θr at the gradual-change amount calculating section 121-1 (Step S33), and performs the integration processing with limit at the integrating section 121-2 with output limit thereby to output the vehicle slip gain WSG (Step S34).

The 4 wheel speeds Vw is inputted into the driving-wheel slip judging section 122 in the correction gain calculating section 120 (Step S40), the front wheel speed Wf is calculated based on the 4 wheel speeds Vw (Step S41), and the rear wheel speed Wr is calculated (Step S42). The gradual-change amount VHD for driving-wheel slip gain corresponding to the absolute value of the difference between the front wheel speed Wf and the rear wheel speed Wr is calculated at the gradual-change amount calculating section 122-1 in the driving-wheel slip judging section 122 (Step S43), and the limited integration processing is performed at the integrating section 122-2 with output limit thereby to output the driving-wheel slip gain DWG (Step S44).

The vehicle slip gain WSG and the driving-wheel slip gain DWG are inputted into the multiplying section 123, and the multiplied result at the multiplying section 123 is outputted as the correction gain CG (Step S45).

Figure 22:
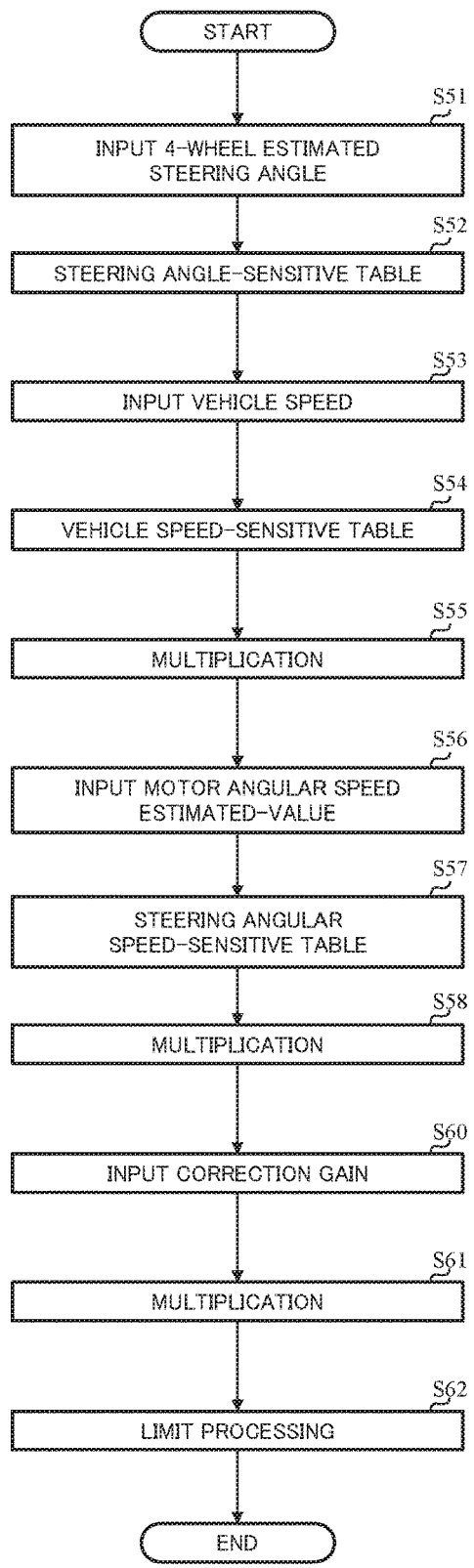
FIG. 22 is a flowchart showing exemplary operations of the steering wheel return control section.

The exemplary operations of the steering wheel return control section 150 will be described below with reference to the flowchart of FIG. 22 and the exemplary configuration of FIG. 15.

The 4-wheel estimated steering angle θest is first inputted into the steering angle-sensitive table 151 (Step S51), and the steering angle-sensitive table 151 outputs the steering angle θ1 corresponding to the 4-wheel estimated steering angle θest (Step S52). Further, the vehicle speed Vel is inputted into the vehicle speed-sensitive table 152 (Step S53), and the vehicle speed-sensitive table 152 outputs the output yell corresponding to the vehicle speed Vel (Step S54) to be multiplied by the steering angle θ1 at the multiplying section 154 (Step S55). Further, the motor angular speed estimated-value ωm is inputted into the steering angle speed-sensitive table 153 (Step S56), and the steering angle speed-sensitive table 153 outputs the angle speed ωm1 corresponding to the motor angular speed estimated-value ωm (Step S57). The angle speed ωm1 is inputted into the multiplying section 155 and multiplied by the multiplied result θ2 at the multiplying section 154 (Step S58), and the basic control value HRa as the multiplied result is inputted into the multiplying section 156.

Thereafter, the correction gain CG calculated at the correction gain calculating section 120 is inputted into the multiplying section 156 (Step S60), and is multiplied by the basic control value HRa (Step S61). The basic control value HRb as the multiplied result at the multiplying section 156 is inputted into the output limit processing section 157 to output the steering wheel return control value HRC with limited maximum value (Step S62), and the steering wheel return control value HRC is inputted into the adding section 160.

The description has been made by way of steering wheel return control, but the present invention is applicable to other control using a 4-wheel estimated steering angle (such as lane keep assist for preventing lane deviation, or active corner lamp for directing a light in a steering direction).

EXPLANATION OF REFERENCE NUMERALS 1 handle (steering wheel)
2 column shaft (steering shaft, handle shaft)
12 vehicle speed sensor
13 battery
20 motor
31 current command value calculating section
32 steering wheel return control section
33 current limiting section
35 current control section
36 PWM-control section
37 inverter
100 steering angle estimating section
110 steering-angle estimating/calculating section
120 correction gain calculating section
121 vehicle slip judging section
122 driving wheel slip judging section
150 steering wheel return control section
151 steering angle-sensitive table
152 vehicle speed-sensitive table
153 steering angle speed-sensitive table

The invention claimed is:
1. An electric power steering apparatus which has a steering torque sensor to detect a steering torque inputted into a steering mechanism, a current command value calculating section to calculate a current command value based on at least said steering torque, a motor to apply an assist torque to said steering mechanism, and a motor driving control section to drive and control said motor based on said current command value, comprises:
 a control function with an input steering angle;
 a steering angle estimating and calculating section of a control unit to calculate a front-wheel estimated steering angle and a rear-wheel estimated steering angle based on 4 wheel speeds and calculate a 4-wheel estimated steering angle by using said front-wheel estimated steering angle and said rear-wheel estimated steering angle;
 a correction gain calculating section of the control unit to calculate a correction gain to correct said 4-wheel estimated steering angle or an output of a control used said 4-wheel estimated steering angle based on said 4 wheel speeds, said front-wheel estimated steering angle and said rear-wheel estimated steering angle;

wherein said correction gain calculating section of the control unit comprises a vehicle slip judging section to output a vehicle slip gain based on said front-wheel estimated steering angle and said rear-wheel estimated steering angle, a driving-wheel slip judging section to output a driving-wheel slip gain based on said 4 wheel speeds, and a multiplying section to multiply said vehicle slip gain by said driving-wheel slip gain thereby to output said correction gain, wherein said 4-wheel estimated steering angle is used for a steering angle control.

2. The electric power steering apparatus according to claim 1, wherein said vehicle slip judging section determines a gradual-change amount for vehicle slip gain corresponding to a first absolute value of a first difference between said front-wheel estimated steering angle and said rear-wheel estimated steering angle, and outputs said vehicle slip gain by changing with said gradual-change amount for vehicle slip gain.

3. The electric power steering apparatus according to claim 2, wherein said gradual-change amount for vehicle slip gain is changed corresponding to a vehicle speed.

4. The electric power steering apparatus according to claim 3, wherein said driving-wheel slip judging section judges a gradual-change amount for driving wheel slip gain corresponding to a second absolute value of a second difference between a front wheel speed and a rear wheel speed based on said 4 wheel speeds, and outputs said driving-vehicle slip gain by changing with said gradual-change amount for driving-vehicle slip gain.

5. The electric power steering apparatus according to claim 3, wherein said steering angle estimating and calculating section comprises a weighting section to change and calculate weights of said front-wheel estimated steering angle and said rear-wheel estimated steering angle corresponding to said vehicle speed, a steering angle speed, or said steering torque.

6. The electric power steering apparatus according to claim 5, wherein said weighting section comprises:
 a sensitive table to output a front-wheel weight (X) and a rear-wheel weight (Y) corresponding to said vehicle speed, said steering angle speed, or said steering torque,
 a first multiplying section to multiply said front-wheel estimated steering angle by said front-wheel weight (X),
 a second multiplying section to multiply said rear-wheel estimated steering angle by said rear-wheel weight (Y), and
 an adding section to add the multiplied results at said first multiplying section and said second multiplying section thereby to output said 4-wheel estimated steering angle.

7. The electric power steering apparatus according to claim 2, wherein said driving-wheel slip judging section judges a gradual-change amount for driving wheel slip gain corresponding to a second absolute value of a second difference between a front wheel speed and a rear wheel speed based on said 4 wheel speeds, and outputs said driving-vehicle slip gain by changing with said gradual-change amount for driving-vehicle slip gain.

8. The electric power steering apparatus according to claim 2, wherein said steering angle estimating and calculating section comprises a weighting section to change and calculate weights of said front-wheel estimated steering angle and said rear-wheel estimated steering angle corresponding to a vehicle speed, a steering angle speed, or said steering torque.

9. The electric power steering apparatus according to claim 8, wherein said weighting section comprises:
 a sensitive table to output a front-wheel weight (X) and a rear-wheel weight (Y) corresponding to said vehicle speed, said steering angle speed, or said steering torque,
 a first multiplying section to multiply said front-wheel estimated steering angle by said front-wheel weight (X),
 a second multiplying section to multiply said rear-wheel estimated steering angle by said rear-wheel weight (Y), and
 an adding section to add the multiplied results at said first multiplying section and said second multiplying section thereby to output said 4-wheel estimated steering angle.

10. The electric power steering apparatus according to claim 1, wherein said driving-wheel slip judging section judges a gradual-change amount for driving wheel slip gain corresponding to a second absolute value of a second difference between a front wheel speed and a rear wheel speed based on said 4 wheel speeds, and outputs said driving-vehicle slip gain by changing with said gradual-change amount for driving-vehicle slip gain.

11. The electric power steering apparatus according to claim 1, wherein said steering angle estimating and calculating section comprises a weighting section to change and calculate weights of said front-wheel estimated steering angle and said rear-wheel estimated steering angle corresponding to a vehicle speed, a steering angle speed, or said steering torque.

12. The electric power steering apparatus according to claim 11, wherein said weighting section comprises:
 a sensitive table to output a front-wheel weight (X) and a rear-wheel weight (Y) corresponding to said vehicle speed, said steering angle speed, or said steering torque,
 a first multiplying section to multiply said front-wheel estimated steering angle by said front-wheel weight (X),
 a second multiplying section to multiply said rear-wheel estimated steering angle by said rear-wheel weight (Y), and
 an adding section to add the multiplied results at said first multiplying section and said second multiplying section thereby to output said 4-wheel estimated steering angle.

13. An electric power steering apparatus which has a steering torque sensor to detect a steering torque inputted into a steering mechanism, a current command value calculating section to calculate a current command value based on at least said steering torque, a motor to apply an assist torque to said steering mechanism, and a motor driving control section to drive and control said motor based on said current command value, comprises:
 a steering angle estimating and calculating section of a control unit to calculate a front-wheel estimated steering angle and a rear-wheel estimated steering angle based on 4 wheel speeds, and calculate a 4-wheel estimated steering angle by using said front-wheel estimated steering angle and said rear-wheel estimated steering angle;
 a correction gain calculating section of the control unit to calculate a correction gain to correct an irregular output based on said 4 wheel speeds, said front-wheel estimated steering angle and said rear-wheel estimated steering angle; and a steering wheel return control section of the control unit to calculate a steering wheel return control value based on said 4 wheel speeds, said correction gain, a vehicle speed and a motor angular speed estimated-value, wherein said correction gain calculating section comprises a vehicle slip judging section to output a vehicle slip gain based on said front-wheel estimated steering angle and said rear-wheel estimated steering angle, a driving-wheel slip judging section to output a driving-wheel slip gain based on said 4 wheel speeds, and a multiplying section to multiply said vehicle slip gain by said driving-wheel slip gain thereby to output said correction gain, and wherein said current command value is corrected by said steering wheel return control value.

14. The electric power steering apparatus according to claim 13, wherein said steering angle estimating and calculating section comprises a weighting section to change and calculate weights of said front-wheel estimated steering angle and said rear-wheel estimated steering angle corresponding to said vehicle speed, a steering angle speed, or said steering torque.

* * * * *